United States Patent
Sugiura

(10) Patent No.: US 10,024,429 B2
(45) Date of Patent: Jul. 17, 2018

(54) AUTOMATIC TRANSMISSION

(71) Applicant: AISIN AW CO., LTD., Anjo-shi, Aichi (JP)

(72) Inventor: Nobutada Sugiura, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 405 days.

(21) Appl. No.: 14/761,910

(22) PCT Filed: Feb. 26, 2014

(86) PCT No.: PCT/JP2014/054622
§ 371 (c)(1),
(2) Date: Jul. 17, 2015

(87) PCT Pub. No.: WO2014/132980
PCT Pub. Date: Sep. 4, 2014

(65) Prior Publication Data
US 2015/0354700 A1  Dec. 10, 2015

(30) Foreign Application Priority Data
Feb. 28, 2013  (JP) ................. 2013-038569

(51) Int. Cl.
*F16H 63/30* (2006.01)
*F16H 61/686* (2006.01)
(Continued)

(52) U.S. Cl.
CPC ......... *F16H 63/304* (2013.01); *F16D 25/061* (2013.01); *F16H 61/00* (2013.01); *F16H 61/686* (2013.01); *F16H 63/3043* (2013.01); *F16D 2011/004* (2013.01); *F16H 2057/087* (2013.01); *F16H 2061/0046* (2013.01); *F16H 2200/0073* (2013.01); *F16H 2200/201* (2013.01);
(Continued)

(58) Field of Classification Search
USPC ...................................... 192/85.18
See application file for complete search history.

(56) References Cited

U.S. PATENT DOCUMENTS 3,444,972 A * 5/1969 Carstensen ........... F16D 25/061
                                                192/110 B
4,293,061 A  10/1981 Brown
(Continued)

FOREIGN PATENT DOCUMENTS

DE         697 11 513 T2     10/2002
DE    10 2005 038 925 A1      3/2006
(Continued)

OTHER PUBLICATIONS

Jun. 10, 2014 International Search Report issued in International Application No. PCT/JP2014/054622.

*Primary Examiner* — Mark Alan Manley
(74) *Attorney, Agent, or Firm* — Oliff PLC

(57) ABSTRACT

An automatic transmission including a clutch that can engage rotation transmission of two rotary members by supplying an engagement pressure to an engagement hydraulic oil chamber disposed on an outer peripheral side of a central shaft to press and move a piston member to one axial side, and disengage the rotation transmission of the two rotary members with an other-side pressing mechanism that presses and drives the piston member to the other axial side.

9 Claims, 4 Drawing Sheets

(51) Int. Cl.
    *F16D 25/061*     (2006.01)
    *F16H 61/00*     (2006.01)
    *F16H 57/08*     (2006.01)
    *F16D 11/00*     (2006.01)

(52) U.S. Cl.
    CPC ............... *F16H 2200/2048* (2013.01); *F16H 2200/2064* (2013.01); *F16H 2200/2094* (2013.01)

(56) References Cited

U.S. PATENT DOCUMENTS

| | | | | |
|---|---|---|---|---|
| 7,211,017 | B2* | 5/2007 | Green | B60K 17/16 192/85.18 |
| 2004/0214685 | A1* | 10/2004 | Korenjak | F16D 25/00 477/44 |
| 2006/0040782 | A1 | 2/2006 | Diemer et al. | |
| 2006/0101942 | A1 | 5/2006 | Onishi et al. | |
| 2012/0083374 | A1 | 4/2012 | Ziemer et al. | |

FOREIGN PATENT DOCUMENTS

| | | |
|---|---|---|
| DE | 11 2005 002 431 T5 | 10/2007 |
| DE | 10 2009 026 710 A1 | 12/2010 |
| EP | 0 825 359 A2 | 2/1998 |
| JP | S63-4436 U | 1/1988 |
| JP | H07-12184 A | 1/1995 |
| JP | H07-279992 A | 10/1995 |
| JP | H10-61733 A | 3/1998 |
| JP | 2006-144879 A | 6/2006 |
| JP | 2008-115915 A | 5/2008 |

\* cited by examiner

FIG. 2

|     | C-1 | C-2 | C-3 | C-4 | C-5 | B-1 | B-2 |
|-----|-----|-----|-----|-----|-----|-----|-----|
| 1st |     | ○   |     | ○   | ○   | ○   |     |
| 2nd |     | ○   |     | ○   |     | ○   | ○   |
| 3rd |     | ○   |     | ○   | ○   |     | ○   |
| 4th |     | ○   | ○   | ○   |     |     | ○   |
| 5th | ○   | ○   |     | ○   |     |     | ○   |
| 6th | ○   | ○   | ○   |     |     |     | ○   |
| 7th | ○   | ○   | ○   |     | ○   |     |     |
| 8th | ○   |     | ○   |     | ○   |     | ○   |
| 9th | ○   |     | ○   |     | ○   | ○   |     |
| 10th| ○   |     | ○   |     |     | ○   | ○   |
| 11th| ○   |     |     | ○   |     | ○   | ○   |
| Rev |     | ○   | ○   | ○   |     | ○   |     |

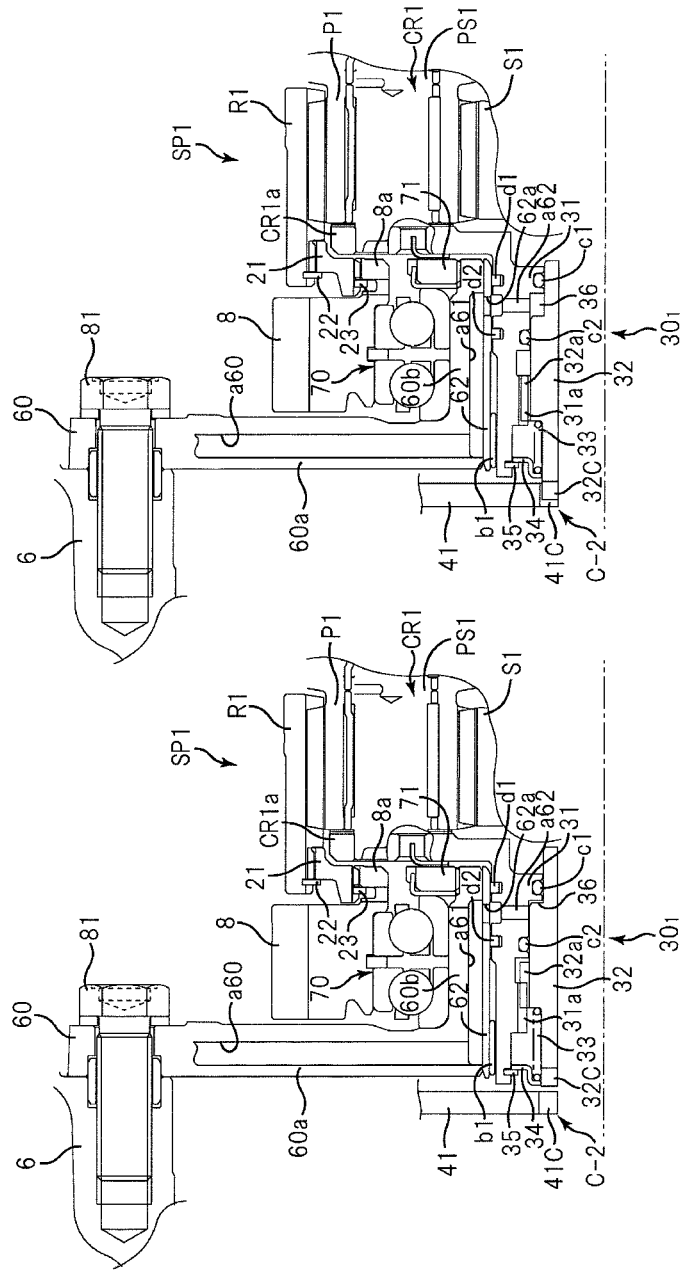

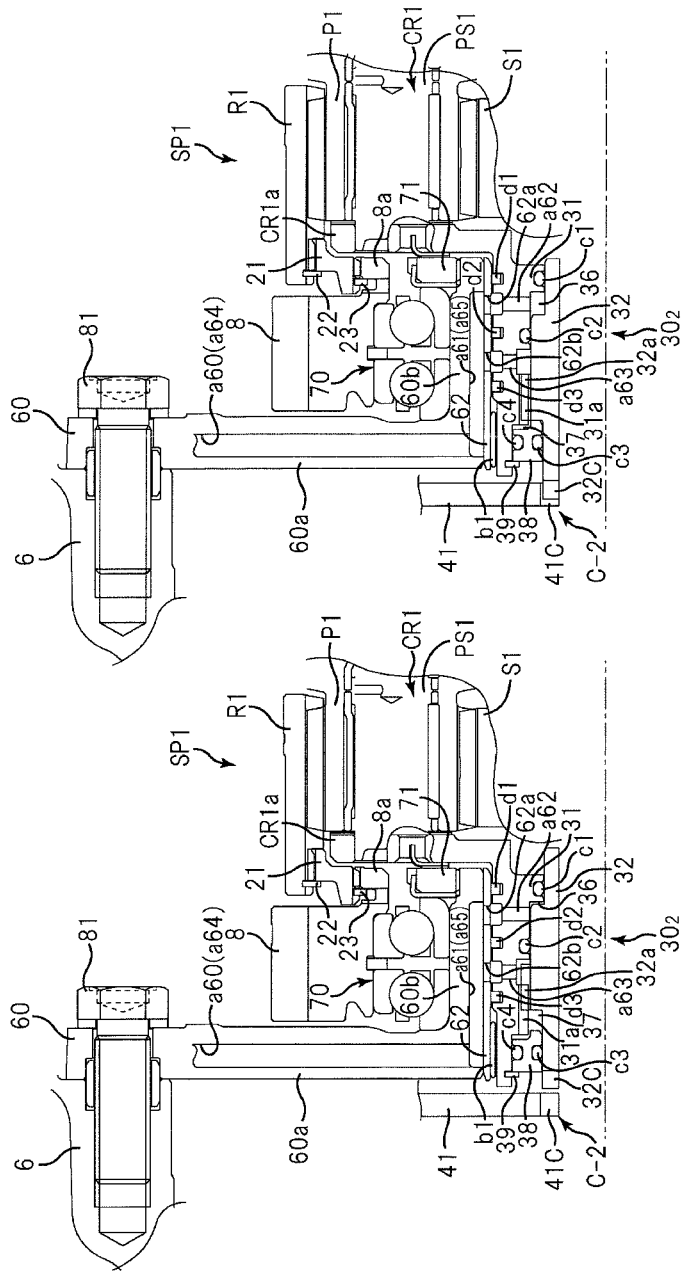

AUTOMATIC TRANSMISSION

BACKGROUND

The present disclosure relates to an automatic transmission that is mounted on a vehicle, and the like, and in particular, to an automatic transmission including a clutch that can engage or disengage the rotation transmission of two rotary members.

A wet multiple plate clutch is generally adopted for an automatic transmission, and in particular, for a multi-stage automatic transmission mounted on a vehicle, and the like (see Japanese Patent Application Publication No. 2008-115915). The wet multi-plate clutch includes, for example, a hydraulic servo disposed on an outer peripheral side of a central shaft disposed at a center of the automatic transmission. When engaging such a clutch, an engagement pressure is supplied to a hydraulic oil chamber through an oil passage, which passes through the interior of the central shaft, and a piston is pressed and driven in an axial direction to press a plurality of friction plates and engage the friction plates, thereby engaging the power transmission of two rotary members.

When disengaging such a clutch, the engagement pressure supplied to the hydraulic oil chamber is lowered (engagement pressure is removed from the oil passage passing through the interior of the central shaft), and the piston is pressed and moved to the opposite side in the axial direction mainly by an urging force of a return spring. In this case, however, a pressure (centrifugal oil pressure) caused by the centrifugal force is generated in the hydraulic oil of the hydraulic oil chamber since the hydraulic servo is in a rotating state in most cases, and it is often difficult to disengage the clutch with only the urging force of the return spring. Thus, a cancel oil chamber having the same pressure receiving area as that of the hydraulic oil chamber is provided and the cancel oil chamber is filled with oil to cancel the centrifugal oil pressure generated in the piston member, thereby making the axial movement of the piston by the return spring smooth and achieving the disengagement of the clutch.

SUMMARY

However, the clutch structure and the oil passage structure may become complex if the cancel oil chamber is disposed in the hydraulic servo of the clutch as described above.

Furthermore, when a part of a speed change mechanism (planetary gear, other clutches, etc.) is disposed on both axial sides of the clutch, for example, the engagement pressure cannot be directly supplied from a case to a hydraulic oil chamber in a hydraulic servo of the clutch, and the engagement pressure supplied from a hydraulic control device to the case is conducted to the central shaft and supplied from the central shaft to the hydraulic oil chamber in the hydraulic servo on the outer peripheral side. Therefore, two or more areas including at least an area between the case and the central shaft and an area between the central shaft and the hydraulic servo need to be sealed, whereby the number of seal rings increases and the sliding resistance increases. This prevents the enhancement in the transmission efficiency of the automatic transmission.

It is an exemplary aspect of the present disclosure to provide an automatic transmission capable of simplifying the clutch structure and reducing the number of seal rings to enhance the transmission efficiency.

An automatic transmission according to an exemplary embodiment includes a clutch that can engage rotation transmission of two rotary members by supplying an engagement pressure to an engagement hydraulic oil chamber disposed on an outer peripheral side of a central shaft to press and move a piston member to one axial side, and disengage the rotation transmission of the two rotary members with an other-side pressing mechanism that presses and drives the piston member to the other axial side, wherein the clutch includes a cylinder member that covers at least an outer peripheral side of the engagement hydraulic oil chamber, forms the engagement hydraulic oil chamber between the piston member and the cylinder member, and has an engagement pressure conducting oil passage formed to run through the cylinder member on the outer peripheral side of the engagement hydraulic oil chamber, an engagement pressure supplying oil passage that can supply the engagement pressure to the engagement hydraulic oil chamber through the engagement pressure conducting oil passage is disposed, and the engagement pressure can be supplied from the outer peripheral side of the engagement hydraulic oil chamber to the engagement hydraulic oil chamber of the clutch.

The engagement pressure can be thus supplied from the outer peripheral side of the engagement hydraulic oil chamber to the engagement hydraulic oil chamber of the clutch, so that, for example, the cancel oil chamber can be eliminated and the clutch structure can be simplified. Furthermore, compared to the case where the engagement pressure is supplied from the central shaft to the engagement hydraulic oil chamber of the clutch, the number of the sealing areas can be reduced and the number of seal rings can be reduced, thereby enhancing the transmission efficiency as the engagement pressure can be supplied from the outer peripheral side, directly from the engagement pressure supplying oil passage to the engagement hydraulic oil chamber.

The present disclosure according to an exemplary embodiment, wherein the engagement pressure supplying oil passage has at least one part formed in a case that accommodates a speed change mechanism in which an input rotational speed is changed and output, and the engagement pressure can be supplied toward an inner circumference from the case to the outer peripheral side of the engagement pressure conducting oil passage of the cylinder member.

Thus, at least a part of the engagement pressure supplying oil passage is formed in the case accommodating the speed change mechanism, whereby the engagement pressure can be supplied toward the inner circumference from the case to the outer peripheral side of the engagement pressure conducting oil passage of the cylinder member.

The present disclosure according to an exemplary embodiment, further includes a center support member that is fixed to the case accommodating the speed change mechanism and that rotatably supports an output gear that outputs a rotation of the speed change mechanism on an outer peripheral side of the clutch; wherein a part of the engagement pressure supplying oil passage is formed inside the center support member, and the engagement pressure can be supplied toward the inner circumference from the case to the outer peripheral side of the engagement pressure conducting oil passage of the cylinder member through the engagement pressure supplying oil passage of the center support member.

The engagement pressure can be thus supplied toward the inner circumference from the case to the outer peripheral side of the engagement pressure conducting oil passage of the cylinder member through the engagement pressure supplying oil passage of the center support member. Furthermore, the number of the sealing areas can be reduced to one, which is between the center support member and the clutch, since the engagement pressure supplying oil passage is formed inside the center support member, whereby the number of seal rings can be reduced and the transmission efficiency can be enhanced.

The present disclosure according to an exemplary embodiment, wherein the other-side pressing mechanism is a return spring that presses and moves the piston member to the other axial side.

Thus, the cancel oil chamber and the disengagement hydraulic oil chamber can be eliminated since the other-side pressing mechanism can be configured with a return spring that presses and moves the piston member to the other axial side, and the clutch structure can be simplified.

The present disclosure according to an exemplary embodiment, wherein the other-side pressing mechanism is a disengagement hydraulic oil chamber that presses and moves the piston member to the other axial side when a disengagement pressure is supplied, the cylinder member has a disengagement pressure conducting oil passage formed to run through the cylinder member on an outer peripheral side of the disengagement hydraulic oil chamber, and a disengagement pressure supplying oil passage that can supply the disengagement pressure to the disengagement hydraulic oil chamber through the disengagement pressure conducting oil passage is disposed.

The other-side pressing mechanism is thus configured with the disengagement hydraulic oil chamber that presses and moves the piston member to the other axial side when the disengagement pressure is supplied, whereby the cancel oil chamber and the return spring can be eliminated and the clutch structure can be simplified.

The present disclosure according to an exemplary embodiment, wherein part of the speed change mechanism in which the input rotational speed is changed and output is disposed on one axial side and the other axial side of the clutch.

Thus, a part of the speed change mechanism is disposed on one axial side and the other axial side of the clutch, so that when the engagement pressure is supplied from the inner peripheral side to the engagement hydraulic oil chamber, for example, the engagement pressure cannot be supplied directly from the case and is supplied through the central shaft, and hence at least two areas, which are between the case and the central shaft and between the central shaft and the clutch, need to be sealed. However, the number of the sealing areas can be reduced to one, which is between the engagement pressure supplying oil passage and the clutch, by supplying the engagement pressure from the outer peripheral side of the engagement hydraulic oil chamber, and the number of seal rings can be reduced, thereby enhancing the transmission efficiency.

The present disclosure according to an exemplary embodiment, wherein the clutch is a meshing clutch that meshes with each other when teeth formed on the two rotary members are engaged.

Since the clutch is the meshing clutch that meshes with each other when the teeth formed on the two rotary members are engaged, the outer diameter of the engagement hydraulic oil chamber can be reduced, the diameter of the seal ring disposed on the outer circumference of the cylinder member can be reduced, the sliding resistance can be reduced, and the transmission efficiency can be enhanced.

BRIEF DESCRIPTION OF THE DRAWINGS

FIG. 2 is an engagement table of the automatic transmission.

FIG. 3 is a partially omitted cross-sectional view showing a clutch according to a first embodiment.

FIG. 4 is a partially omitted cross-sectional view showing a clutch according to a second embodiment.

DETAILED DESCRIPTION OF THE EMBODIMENTS

First Embodiment

Figure 1:
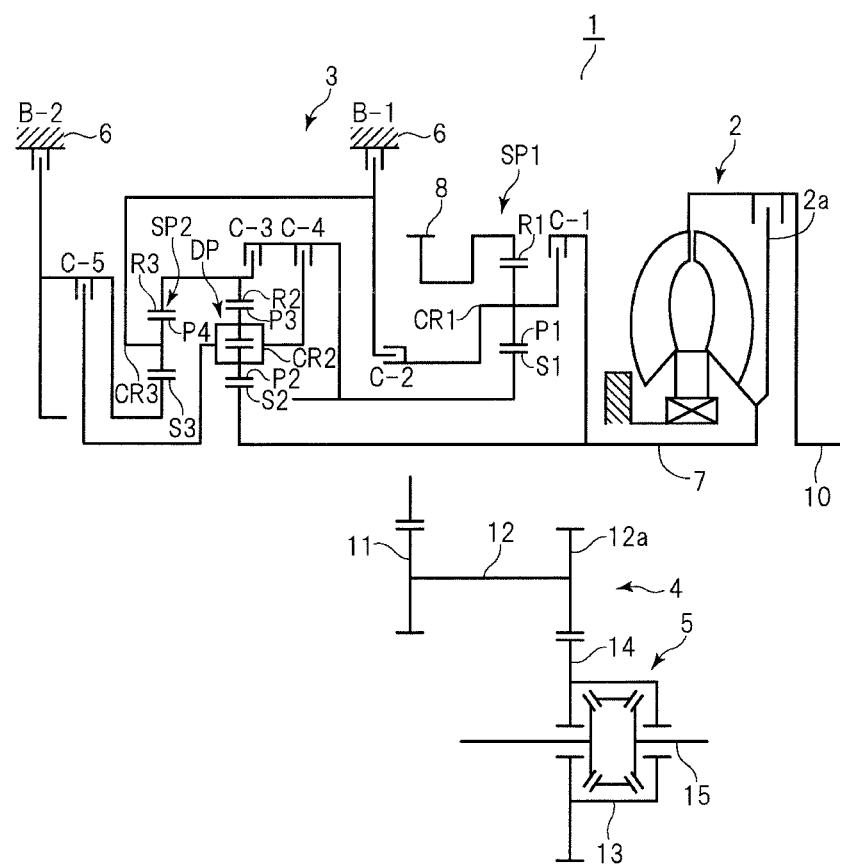
FIG. 1 is a skeleton diagram showing an automatic transmission to which the present disclosure can be applied.

A first embodiment according to the present disclosure will be hereinafter described with reference to FIGS. 1 to 3. An automatic transmission according to the present disclosure is an automatic transmission that is preferably mounted on a vehicle such as e.g., a front engine, front drive (FF) vehicle. The lateral direction in FIG. 1 corresponds to the lateral direction (or the opposite lateral direction) in the state where the automatic transmission is actually mounted on the vehicle. For convenience of description, the right side in the figure, which is a drive source side such as an engine, is referred to as the "front side", and the left side in the figure is referred to as the "rear side".

First, the schematic configuration of an automatic transmission 1, to which the present disclosure can be applied, will be described with reference to FIG. 1. As shown in FIG. 1, for example, the automatic transmission 1 that is preferably used in, e.g., FF vehicles includes a torque converter 2 having a lockup clutch 2a on the front side, and a speed change mechanism 3, a countershaft portion 4, and a differential portion 5 on the rear side.

The torque converter 2 is, for example, placed on an axis about an input shaft 7 of the speed change mechanism 3 which is coaxial with an output shaft 10 of an engine (not shown). The speed change mechanism 3 is placed on an axis about a central shaft which is coaxial with the input shaft 7. The countershaft portion 4 is placed on a countershaft 12 that is placed on an axis parallel to the input shaft 7, and the differential portion 5 is placed so as to have right and left drive shafts 15, 15 on an axis parallel to the countershaft 12.

A skeleton diagram of FIG. 1 shows the automatic transmission 1 in a planar developed view, and the input shaft 7, the countershaft 12, and the right and left drive shafts 15, 15 are in a triangular positional relationship when viewed from the side.

The speed change mechanism 3 includes the input shaft 7 to which the rotation from the engine is transmitted via the torque converter 2. The speed change mechanism 3 is accommodated in a case 6, and includes a first planetary gear SP1 and a second planetary gear DP on the input shaft 7, and further includes a third planetary gear SP2 on the rear side.

The first planetary gear SP1 is a so-called single pinon planetary gear that has a first sun gear S1, a first carrier CR1, and a first ring gear R1, and that has on the first carrier CR1 a pinion gear P1 meshing with the first sun gear S1 and the first ring gear R1.

The second planetary gear DP is a so-called double pinon planetary gear that has a second sun gear S2, a second carrier CR2, and a second ring gear R2, and that has on the second carrier CR2 a pinion gear P2 meshing with the second sun gear S2 and a pinion gear P3 meshing with the second ring gear R2 such that the pinon gears P2, P3 mesh with each other.

The third planetary gear SP2 is a so-called single pinon planetary gear that includes a third sun gear S3, a third carrier CR3, and a third ring gear R3, and that has on the third carrier CR3 a pinion gear P4 meshing with the third sun gear S3 and the third ring gear R3.

The second sun gear S2 of the second planetary gear DP is drivingly coupled to the input shaft 7. The second carrier CR2 of the second planetary gear DP is configured to be able to be drivingly coupled to the first sun gear S1 of the first planetary gear SP1 via a fourth clutch C-4 and to be able to be drivingly coupled to the third sun gear S3 of the third planetary gear SP2 via a fifth clutch C-5. The second ring gear R2 of the second planetary gear DP is configured to be able to be drivingly coupled to the first sun gear S1 of the first planetary gear SP1 via a third clutch C-3 and to be able to be drivingly coupled to the third ring gear R3 of the third planetary gear SP2.

The third sun gear S3 of the third planetary gear SP2 can be drivingly coupled to the second carrier CR2 of the second planetary gear DP via of the fifth clutch C-5, as described above, and can be fixed (locked) with respect to the case 6 by a second brake B-2. Furthermore, the third ring gear R3 of the third planetary gear SP2 is drivingly coupled to the second ring gear R2 of the second planetary gear DP, as described above. The third carrier CR3 of the third planetary gear SP2 is configured to be able to be fixed (locked) with respect to the case 6 by a first brake B-1 and to be able to be drivingly coupled to the first carrier CR1 of the first planetary gear SP1 via a second clutch C-2, which is a dog clutch.

The first sun gear S1 of the first planetary gear SP1 can be drivingly coupled to the second carrier CR2 of the second planetary gear DP via the fourth clutch C-4, as described above, and can be drivingly coupled to the second ring gear R2 of the second planetary gear DP via the third clutch C-3. The first carrier CR1 of the first planetary gear SP1 is configured to be able to be fixed (locked) with respect to the case 6 by the first brake B-1, as described above, and also be able to be drivingly coupled to the third carrier CR3 of the third planetary gear SP2 via the second clutch C-2 and be able to be drivingly coupled to the input shaft 7 via the first clutch C-1. The first ring gear R1 of the first planetary gear SP1 is drivingly coupled to a counter gear (output gear) 8.

A counter driven gear 11, which is fixed on the countershaft 12 of the countershaft portion 4, meshes with the counter gear 8, and a gear 14 of the differential portion 5 meshes with the countershaft 12 via an output gear 12a formed on the outer peripheral surface. The gear 14 is fixed to the differential gear 13, and is connected to the right and left drive shafts 15, 15 via the differential gear 13.

The first clutch C-1, the third to fifth clutches C-3 to C-5, the first brake B-1, and the second brake B-2 are wet multi-plate clutches or wet multi-plate brakes in the present embodiment, but are not limited thereto, and may be any type such as a dry single-plate clutch or brake, band brake, dog clutch, and the like as long as a speed can be changed by the speed change mechanism 3 and torque capacity is sufficient.

The automatic transmission 1 having the above configuration attains first (1st) to eleventh (11th) forward speeds and a reverse speed (Rev) by engagement and disengagement of the first to fifth clutches C-1 to C-5 and the first and second brakes B-1, B-2 shown in the skeleton diagram of FIG. 1 according to the combinations shown in an engagement table of FIG. 2.

A structure of the second clutch C-2, which is a main part of the present disclosure, will now be described according to FIG. 3. As shown in FIG. 3A, a center support member 60 is fixed to the case 6 for accommodating the speed change mechanism 3 so as to be integrated with the case 6 by a plurality of bolts 81. The center support member 60 is configured to include a flange portion 60a formed in a flange shape, and a sleeve portion 60b axially extending from an inner peripheral end of the flange portion in a sleeve shape.

An oil passage (part of engagement pressure supplying oil passage) a60 is radially drilled in the flange portion 60a of the center support member 60, and the oil passage a60 is connected to a hydraulic circuit that can supply an engagement pressure $P_{C2-ON}$ of the second clutch C-2 of the hydraulic control device (not shown) through an oil passage (part of engagement pressure supplying oil passage) (not shown) of the case 6. An oil passage a61 is formed in a groove shape on the inner peripheral surface of the sleeve portion 60b so as to communicate with the oil passage a60. A sleeve member 62 is fitted to the inner peripheral surface of the sleeve portion 60b to configure an integrated center support member 60 in a broad sense, in which the sleeve member 62 closes the inner side of the oil passage a61 so that the oil passage a61 is formed as a closed oil passage. The sleeve member 62 is formed with a through-hole 62a, and the oil passage a61 is configured to communicate with an oil passage a62 of the cylinder member 61, to be described in detail later.

An angular ball bearing 70 that rotatably supports the counter gear 8 in an axially immovable manner is disposed on the outer peripheral side of the sleeve portion 60b of the center support member 60. The angular ball bearing 70 is positionally fixed with respect to the sleeve portion 60b of the center support member 60 by a nut 71.

The counter gear 8 supported by the angular ball bearing 70 is formed with an annular supporting portion 8a on a side axially opposite from the flange portion 60a of the center support member 60. A coupling member 21 is spline engaged and also positionally fixed in the axial direction by a snap ring 23 on the outer peripheral side of the annular supporting portion 8a. Furthermore, the first ring gear R1 described above is spline engaged and also positionally fixed in the axial direction by a snap ring 22 on the outer peripheral side of the coupling member 21. Therefore, the first ring gear R1 is coupled to the counter gear 8 via the coupling member 21 with respect to the rotating direction and the axial direction.

The first ring gear R1 meshes with the pinion gear P1 that meshes with the first sun gear S1, and the pinion gear P1 is rotatably supported by a pinion shaft PS1 of the first carrier CR1. The first carrier CR1 supports the pinion shaft PS1 with its side plates on both sides, and one of the side plates CR1a is integrally coupled to a cylinder member 31 configuring a hydraulic servo $30_1$ of the second clutch C-2 at a portion on the inner peripheral side.

The hydraulic servo $30_1$ of the second clutch C-2 is rotatably disposed on the outer peripheral side of the central shaft such as the input shaft 7, and the like (not shown in FIG. 3), and is roughly configured by the cylinder member 31, a piston member (rotary member) 32, a return plate 34, and a return spring (other-side pressing mechanism) 33. An engagement hydraulic oil chamber 36 sealed with seal rings c1, c2 is formed between the cylinder member 31 and the piston member 32.

The cylinder member 31 is integrally extended in the axial direction from the inner peripheral side of the side plate CR1a of the first carrier CR1, as described above, and the outer peripheral surface thereof is rotatably supported by the sleeve portion 60b of the center support member 60 via a bush b1 and the sleeve member 62. One axial end side (vicinity of the engagement hydraulic oil chamber 36) in the inner peripheral surface of the cylinder member 31 is axially in close contact with the outer peripheral surface of the piston member 32 in a slidable manner, and is formed to cover the outer peripheral side of the engagement hydraulic oil chamber 36 formed between the cylinder member 31 and the piston member 32. An oil passage (engagement pressure conducting oil passage) a62, which is an oil hole facing in a radial direction, is formed to run through the cylinder member 31 so as to communicate the engagement hydraulic oil chamber 36 with the oil passage a61 through the through-hole 62a described above. That is, the engagement pressure can be supplied toward the inner circumference from the case 6 to the outer peripheral side of the oil passage a62 of the cylinder member 31 through the oil passages a60, a61 of the center support member 60.

Two seal rings d1, d2 seal between the oil passage a62 and the through-hole 62a of the sleeve member 62. The oil passage a62, in the present embodiment, is simply an oil hole formed to linearly run through the cylinder member 31, but may be an oil passage of any shape as long as the engagement pressure can be supplied to the engagement hydraulic oil chamber 36 from the outer peripheral side to the inner peripheral side.

A spline 31a is formed at the other axial end side (left side in the figure) in the inner peripheral surface of the cylinder member 31, and is spline engaged with a spline 32a formed in the piston member 32 so as to be movable in the axial direction and be drivingly coupled in a rotating direction. That is, the piston member 32 is drivingly coupled in the rotating direction with respect to the cylinder member 31 and is slidably disposed in the axial direction.

Furthermore, the return plate 34 is positionally regulated in the axial direction by a snap ring 35 at the end of the other axial end side (left side in the figure) in the inner peripheral surface of the cylinder member 31. The return spring 33 is provided in a contracted state between the return plate 34 and the piston member 32, that is, the return spring 33 urges the piston member 32 toward the engagement hydraulic oil chamber 36.

A tooth 32C configuring the dog clutch (meshing clutch) is formed at the distal end portion on the other axial end side of the piston member 32. The tooth 32C of the piston member 32 is configured to be able to mesh with a tooth 41C formed on the inner peripheral end of a transmitting member (rotary member) 41 drivingly coupled to the third carrier CR3 (see FIG. 1).

The engaging/disengaging operation of the second clutch C-2, which is the dog clutch, will now be described according to FIG. 3. First, when, for example, a control unit (not shown) determines a shift speed based on a vehicle speed and the accelerator operation amount, and determines the disengagement of the second clutch C-2 based on the engagement table of FIG. 2, an engagement pressure $P_{C2-ON}$ is not output from the hydraulic control device (not shown) electronically controlled by the control unit, and the hydraulic pressure is not supplied to the engagement hydraulic oil chamber 36. Then, as shown in FIG. 3A, the piston member 32 is pressed to the right side in the figure (the other axial side) by the urging force of the return spring 33, so that the tooth 32C of the piston member 32 and the tooth 41C of the transmitting member 41 are separated (meshing is released), and the rotation transmission thereof is disengaged, that is, the second clutch C-2 is in the disengaged state.

When the engagement of the second clutch C-2 is determined based on the shift speed determined by the control unit (not shown), the engagement pressure $P_{C2-ON}$ is output from the hydraulic control device (not shown) electronically controlled by the control unit, and the engagement pressure $P_{C2-ON}$ is supplied to the engagement hydraulic oil chamber 36 through the oil passages a60, a61 of the center support member 60 and the oil passage a62 of the cylinder member 31. Then, as shown in FIG. 3B, the piston member 32 is pressed and driven to the left side in the figure (one axial side) against the urging force of the return spring 33, so that the tooth 32C of the piston member 32 and the tooth 41C of the transmitting member 41 mesh with each other, and the rotation transmission thereof is engaged, that is, the second clutch C-2 is in the engaged state. Thus, the piston member 32 and the transmitting member 41, which are the two rotary members, are integrally rotated, that is, the first carrier CR1 and the third carrier CR3 (see FIG. 1) are in the drivingly coupled state via the cylinder member 31.

Thereafter, when the disengagement of the second clutch C-2 is again determined by the control unit (not shown), the engagement pressure $P_{C2-ON}$ is not output from the hydraulic control device (not shown) electronically controlled by the control unit, and the hydraulic pressure with respect to the engagement hydraulic oil chamber 36 is not supplied. Then, as shown in FIG. 3A, the piston member 32 is pressed to the right side in the figure (the other axial side) by the urging force of the return spring 33. In this case, for example, the centrifugal oil pressure is generated in the engagement hydraulic oil chamber 36 if the hydraulic servo $30_1$ of the second clutch C-2 is in the rotating state. The piston member 32 is returned to the right side in the figure by the urging force of the return spring 33 even if the cancel oil chamber is not provided since the hydraulic pressure of the engagement hydraulic oil chamber 36 escapes from the oil passage a62 on the outer peripheral side to the oil passages a61, a60 based on the centrifugal oil pressure. The tooth 32C of the piston member 32 and the tooth 41C of the transmitting member 41 are thus separated (meshing is released), and the second clutch C-2 is in the disengaged state.

As described above, according to the present automatic transmission 1, the engagement pressure $P_{C2-ON}$ can be supplied from the outer peripheral side of the engagement hydraulic oil chamber 36 to the engagement hydraulic oil chamber 36 of the second clutch C-2, whereby the cancel oil chamber can be eliminated and the clutch structure can be simplified. Furthermore, compared to the case where the engagement pressure $P_{C2-ON}$ is supplied from the central shaft (e.g., input shaft 7) to the engagement hydraulic oil chamber 36 of the second clutch C-2, the number of the sealing areas can be reduced to one, which is between the center support member 60 (specifically, sleeve member 62) and the cylinder member 31 by supplying the engagement pressure $P_{C2-ON}$ from the outer peripheral side, directly from the oil passage a62 to the engagement hydraulic oil chamber 36, and hence the number of seal rings can be reduced and the transmission efficiency can be enhanced.

Furthermore, since at least a part of the oil passage for supplying the engagement pressure is formed in the case 6 accommodating the speed change mechanism 3, the engagement pressure $P_{C2-ON}$ can be supplied toward the inner circumference from the case 6 to the outer peripheral side of the oil passage a62 of the cylinder member 31.

Furthermore, the engagement pressure $P_{C2-ON}$ can be supplied toward the inner circumference from the case 6 to the outer peripheral side of the oil passage a62 of the cylinder member 31 through the oil passages a60, a61 of the center support member 60. Moreover, since the oil passages a60, a61 are formed inside the center support member 60, the number of the sealing areas can be reduced to one, which is between the center support member 60 and the second clutch C-2, whereby the number of seal rings can be reduced and the transmission efficiency can be enhanced.

A mechanism for pressing and moving the piston member 32 to the other axial side, which is the right side in the figure, is configured by the return spring 33, and thus the cancel oil chamber and the disengagement hydraulic oil chamber (see FIG. 4) can be eliminated and the clutch structure can be simplified.

Furthermore, since a part of the speed change mechanism is disposed on one axial side and the other axial side of the second clutch C-2 (i.e., the second clutch C-2 is disposed between the first planetary gear SP1 and the second planetary gear DP in the axial direction), when supplying the engagement pressure $P_{C2-ON}$ from the inner peripheral side to the engagement hydraulic oil chamber 36, for example, the engagement pressure $P_{C2-ON}$ cannot be directly supplied from the case 6 and is to be supplied through the central shaft such as the input shaft 7. Thus, at least two areas, which are between the case 6 and the central shaft and between the central shaft and the second clutch C-2, need to be sealed. However, the number of the sealing areas can be reduced to one, which is between the oil passage a61 and the second clutch C-2, by supplying the engagement pressure $P_{C2-ON}$ from the outer peripheral side of the engagement hydraulic oil chamber 36, whereby the number of seal rings can be reduced and the transmission efficiency can be enhanced.

The second clutch C-2 is the dog clutch that mutually meshes when the teeth 32C, 41C formed in the piston member 32 and the transmitting member 41, respectively, which are the two rotary members, are engaged. Thus, compared to the engagement oil chamber of the hydraulic servo of the multi-plate clutch, for example, the outer diameter of the engagement hydraulic oil chamber 36 can be reduced and the diameter of the seal ring disposed on the outer circumference of the cylinder member 31 can be reduced, whereby the sliding resistance can be reduced and the transmission efficiency can be enhanced.

Second Embodiment

A second embodiment in which the first embodiment is partially changed will now be described according to FIG. 4. In the second embodiment, the same reference numerals are denoted on the portions similar to the first embodiment, and the description thereof will be omitted.

A hydraulic servo $30_2$ of the second clutch C-2 of the automatic transmission 1 according to the second embodiment is configured to include a disengagement hydraulic oil chamber (other-side pressing mechanism) 37, oil passages (disengagement pressure supplying oil passages) a64, a65 and an oil passage (disengagement pressure conducting oil passage) a63 for supplying the disengagement pressure $P_{C2-OFF}$ to the disengagement hydraulic oil chamber 37, without the return spring 33, compared to the first embodiment.

Specifically, as shown in FIG. 4A, in the center support member 60, the oil passage a64 is radially drilled at a position different in a circumferential direction from the oil passage a60 in the flange portion 60a, and the groove-shaped oil passage a65 is provided at a position different in the circumferential direction from the oil passage a61 in the sleeve portion 60b. The sleeve member 62 that closes the inner peripheral surface of the sleeve portion 60b is formed with a through-hole 62b that communicates with the oil passage a65, and the cylinder member 31 includes the oil passage a63 that is formed to run through the cylinder member 31 and that communicates with the oil passages a64, a65 through the through-hole 62b.

A pressure receiving member 38 interposed between the cylinder member 31 and the piston member 32 is disposed so as to be positionally fixed in the axial direction by a snap ring 39 at the distal end portion of the cylinder member 31 on the left side in the figure. The pressure receiving member 38 seals a space between the cylinder member 31 and the piston member 32 with the seal rings c3, c4 disposed on the inner peripheral surface and the outer peripheral surface to form the disengagement hydraulic oil chamber 37.

In the hydraulic servo $30_2$ of the second clutch C-2 according to the second embodiment configured as above, when the disengagement of the second clutch C-2 (see FIG. 2) is first determined based on the shift speed determined by the control unit (not shown), the engagement pressure $P_{C2-ON}$ is not output from the hydraulic control device (not shown) electronically controlled by the control unit and the disengagement pressure $P_{C2-OFF}$ is output so as to be supplied to the disengagement hydraulic oil chamber 37 through the oil passages a64, a65 of the center support member 60 and the oil passage a63 of the cylinder member 31. Then, as shown in FIG. 4A, the piston member 32 is pressed to the right side (the other axial side) in the figure by the disengagement pressure $P_{C2-OFF}$ of the disengagement hydraulic oil chamber 37, so that the tooth 32C of the piston member 32 and the tooth 41C of the transmitting member 41 are separated (meshing is released) and the second clutch C-2 is in the disengaged state.

When the engagement of the second clutch C-2 is determined based on the shift speed determined by the control unit (not shown), the disengagement pressure $P_{C2-OFF}$ is not output from the hydraulic control device (not shown) electronically controlled by the control unit and the engagement pressure $P_{C2-ON}$ is output so as to be supplied to the engagement hydraulic oil chamber 36 through the oil passages a60, a61 of the center support member 60 and the oil passage a62 of the cylinder member 31. In this case, if the hydraulic servo $30_2$ of the second clutch C-2 is in the rotating state, for example, the centrifugal oil pressure is generated in the disengagement hydraulic oil chamber 37. The piston member 32 is pressed and driven to the left side (one axial side) in the figure since the hydraulic pressure of the disengagement hydraulic oil chamber 37 escapes from the oil passage a63 on the outer peripheral side to the oil passages a65, a64 based on the centrifugal oil pressure. The tooth 32C of the piston member 32 and the tooth 41C of the transmitting member 41 thus mesh with each other and the second clutch C-2 is in the engaged state, as shown in FIG. 4B.

Thereafter, when the disengagement of the second clutch C-2 is again determined by the control unit (not shown), the engagement pressure $P_{C2-ON}$ is not output from the hydraulic control device (not shown) electronically controlled by the control unit and the disengagement pressure $P_{C2-OFF}$ is output so that the hydraulic pressure with respect to the engagement hydraulic oil chamber 36 is not supplied and the disengagement pressure $P_{C2-OFF}$ is supplied to the disengagement hydraulic oil chamber 37. Then, as shown in FIG. 4A, the piston member 32 is pressed to the right side (the other axial side) in the figure by the disengagement pressure $P_{C2-OFF}$ of the disengagement hydraulic oil chamber 37. In this case, if the hydraulic servo $30_2$ of the second clutch C-2 is in the rotating state, for example, the centrifugal oil pressure is generated in the engagement hydraulic oil chamber 36. The piston member 32 is returned to the right side in the figure by the disengagement pressure $P_{C2-OFF}$ of the disengagement hydraulic oil chamber 37 even if the cancel oil chamber is not provided since the hydraulic pressure of the engagement hydraulic oil chamber 36 escapes from the oil passage a62 on the outer peripheral side to the oil passages a61, a60 based on the centrifugal oil pressure. The tooth 32C of the piston member 32 and the tooth 41C of the transmitting member 41 are thus separated (meshing is released) and the second clutch C-2 is in the disengaged state.

According to the automatic transmission 1 of the second embodiment described above, the disengagement hydraulic oil chamber 37 that presses and moves the piston member 32 to the right side (the other axial side) in the figure when the disengagement pressure $P_{C2\text{-}OFF}$ is supplied is configured, so that the cancel oil chamber and the return spring 33 (see FIG. 3) can be eliminated and the clutch structure can be simplified.

Other configurations, operations, and effects of the second embodiment are similar to those of the first embodiment, and thus the description thereof will be omitted.

The first and second embodiments described above describe that the engagement pressure is supplied from the outer peripheral side to the hydraulic oil chamber of the dog clutch to engage the clutch, but similar effects can be obtained in that the cancel oil chamber can be eliminated and the clutch structure can be simplified even if, for example, the engagement pressure is supplied from the outer peripheral side with respect to the hydraulic oil chamber of the hydraulic servo of the multi-plate clutch. However, in the case of the hydraulic servo of the multi-plate clutch, the outer diameter of the hydraulic oil chamber (clutch drum) is assumed to become large compared to the dog clutch, and thus the sliding resistance may increase by the amount of the diameter of the seal ring increased. Therefore, the effects of the present disclosure are greater with the dog clutch than the multi-plate clutch since the diameter of the hydraulic oil chamber of the dog clutch can be made small.

Furthermore, in the first and second embodiments described above, at least a part of the engagement pressure supplying oil passage is formed in the case 6 and another part is formed in the center support member 60 to configure the oil passage that supplies the engagement pressure toward the inner circumference from the hydraulic control device to the engagement pressure conducting oil passage a62. However, for example, the engagement pressure may be directly supplied toward the inner circumference from the engagement pressure supplying oil passage of the case 6 to the engagement pressure conducting oil passage a62 of the cylinder member 31 without using the center support member 60 as an intermediary.

In the first and second embodiments described above, the present disclosure is applied on the speed change mechanism 3 that achieves eleven forward speeds and a reverse speed. However, the present disclosure is not limited to this example, and the automatic transmission may be of any number of speeds. Furthermore, the automatic transmission may be a belt type continuously variable transmission and a toroidal type continuously variable transmission, and in particular, the present disclosure can be applied to any type of transmission as long as it is a self-propelled transmission including a clutch with a hydraulic oil chamber that generates the centrifugal force caused by rotation.

In the first and second embodiments described above, the automatic transmission 1 has been described as an automatic transmission connected to the internal combustion engine, but the present disclosure is not limited to this example. For example, the present disclosure may also be applied to the automatic transmission for a hybrid vehicle in which a motor generator is disposed in place of the torque converter.

INDUSTRIAL APPLICABILITY

The automatic transmission according to the present disclosure can be used in vehicles such as passenger vehicles, trucks, and the like, and in particular, is suitably used when simplification of the clutch structure and enhancement of the transmission efficiency are desired.

The invention claimed is:

1. An automatic transmission housed within a case, the transmission including a clutch that can engage rotation transmission of two rotary members by supplying an engagement pressure to an engagement hydraulic oil chamber disposed on an outer peripheral side of a central shaft to press and move a piston member to one axial side, and disengage the rotation transmission of the two rotary members with an other-side pressing mechanism that presses and drives the piston member to the other axial side, wherein
the clutch includes a cylinder member that covers at least an outer peripheral side of the engagement hydraulic oil chamber, forms the engagement hydraulic oil chamber between the piston member and the cylinder member, and has an engagement pressure conducting oil passage formed to run through the cylinder member on the outer peripheral side of the engagement hydraulic oil chamber,
the cylinder member is rotatably supported by the case,
an engagement pressure supplying oil passage that can supply the engagement pressure to the engagement hydraulic oil chamber through the engagement pressure conducting oil passage is disposed, and
the engagement pressure can be supplied from the outer peripheral side of the engagement hydraulic oil chamber to the engagement hydraulic oil chamber of the clutch, wherein
the engagement pressure supplying oil passage has at least one part formed in the case that accommodates a speed change mechanism in which an input rotational speed is changed and output, and
the engagement pressure can be supplied toward an inner circumference from the case to the outer peripheral side of the engagement pressure conducting oil passage of the cylinder member.

2. The automatic transmission according to claim 1, wherein
the clutch is a meshing clutch that meshes with each other when a tooth formed on each of the two rotary members is engaged.

3. The automatic transmission according to claim 1, further comprising:
a center support member that is fixed to the case accommodating the speed change mechanism and that rotatably supports an output gear that outputs a rotation of the speed change mechanism on an outer peripheral side of the clutch; wherein
a part of the engagement pressure supplying oil passage is formed inside the center support member, and
the engagement pressure can be supplied toward the inner circumference from the case to the outer peripheral side of the engagement pressure conducting oil passage of the cylinder member through the engagement pressure supplying oil passage of the center support member.

4. The automatic transmission according to claim 3, wherein the other-side pressing mechanism is a return spring that presses and moves the piston member to the other axial side.

5. The automatic transmission according to claim 3, wherein
the other-side pressing mechanism is a disengagement hydraulic oil chamber that presses and moves the piston member to the other axial side when a disengagement pressure is supplied,
the cylinder member has a disengagement pressure conducting oil passage formed to run through the cylinder member on an outer peripheral side of the disengagement hydraulic oil chamber, and
a disengagement pressure supplying oil passage that can supply the disengagement pressure to the disengagement hydraulic oil chamber through the disengagement pressure conducting oil passage is disposed.

6. The automatic transmission according to claim 1, wherein
the other-side pressing mechanism is a return spring that presses and moves the piston member to the other axial side.

7. The automatic transmission according to claim 1, wherein
the other-side pressing mechanism is a disengagement hydraulic oil chamber that presses and moves the piston member to the other axial side when a disengagement pressure is supplied,
the cylinder member has a disengagement pressure conducting oil passage formed to run through the cylinder member on an outer peripheral side of the disengagement hydraulic oil chamber, and
a disengagement pressure supplying oil passage that can supply the disengagement pressure to the disengagement hydraulic oil chamber through the disengagement pressure conducting oil passage is disposed.

8. An automatic transmission housed within a case, the transmission including a clutch that can engage rotation transmission of two rotary members by supplying an engagement pressure to an engagement hydraulic oil chamber disposed on an outer peripheral side of a central shaft to press and move a piston member to one axial side, and disengage the rotation transmission of the two rotary members with an other-side pressing mechanism that presses and drives the piston member to the other axial side, wherein
the clutch includes a cylinder member that covers at least an outer peripheral side of the engagement hydraulic oil chamber, forms the engagement hydraulic oil chamber between the piston member and the cylinder member, and has an engagement pressure conducting oil passage formed to run through the cylinder member on the outer peripheral side of the engagement hydraulic oil chamber,
the cylinder member is rotatably supported by the case,
an engagement pressure supplying oil passage that can supply the engagement pressure to the engagement hydraulic oil chamber through the engagement pressure conducting oil passage is disposed, and
the engagement pressure can be supplied from the outer peripheral side of the engagement hydraulic oil chamber to the engagement hydraulic oil chamber of the clutch, wherein
a part of a speed change mechanism in which an input rotational speed is changed and output is disposed on one axial side and the other axial side of the clutch.

9. The automatic transmission according to claim 8, wherein this piston
member is rotatably disposed on the outer peripheral side of the central shaft.

* * * * *